United States Patent [19]

Novicky

[11] Patent Number: 4,748,224
[45] Date of Patent: May 31, 1988

[54] SILICONE-SULFONE AND SILICONE-FLUOROCARBON-SULFONE GAS PERMEABLE CONTACT LENSES AND COMPOSITIONS THEREOF

[75] Inventor: Nick N. Novicky, Calgary, Canada

[73] Assignee: Maureen J. DeVou, Alberta, Canada

[21] Appl. No.: 871,259

[22] Filed: Jun. 6, 1986

[30] Foreign Application Priority Data

Feb. 6, 1986 [CA] Canada ................................. 501311

[51] Int. Cl.⁴ ............................................. C08F 30/08
[52] U.S. Cl. .................................... 526/242; 526/245; 526/279; 526/286; 526/916; 523/107; 524/851
[58] Field of Search ............... 526/242, 245, 279, 286; 523/106, 107

[56] References Cited

U.S. PATENT DOCUMENTS

| | | | |
|---|---|---|---|
| 2,538,100 | 1/1951 | Irany | 526/286 |
| 2,793,223 | 5/1957 | Merker | 526/279 |
| 3,594,353 | 7/1971 | Domba | 526/242 |
| 4,182,822 | 1/1980 | Chang | 526/279 |
| 4,216,303 | 8/1980 | Novicky | 526/279 |
| 4,246,389 | 1/1981 | LeBoeuf | 526/279 |
| 4,433,125 | 2/1984 | Ichinoke et al. | 523/107 |

Primary Examiner—C. Warren Ivy
Attorney, Agent, or Firm—Stevens, Davis, Miller & Mosher

[57] ABSTRACT

Highly oxygen permeable hard and semi-hard contact lenses are made from the copolymer of ethylenically unsaturated siloxane ester, ethylenically unsaturated fluorocarbon ester and ethylenically unsaturated sulfone monomer and methods for the polymerization thereof.

27 Claims, No Drawings

SILICONE-SULFONE AND SILICONE-FLUOROCARBON-SULFONE GAS PERMEABLE CONTACT LENSES AND COMPOSITIONS THEREOF

BACKGROUND OF THE INVENTION

Oxygen permeable contact lenses in the prior art are essentially made from siloxane monomer and methyl methacrylate. These lenses are permeable to oxygen; hense, allowing oxygen from the air to pass through the lenses and reach the cornea and allows such lenses to be worn for longer periods of time as compared to non-oxygen permeable contact lenses such as PMMA which were previously available.

Such contact lenses were disclosed in the prior art by Norman G. Gaylord, U.S. Pat. Nos. 3,808,178 and 4,120,570. Later on, Ellis disclosed in his patents, U.S. Pat. Nos. 4,152,508 and 4,330,383, the partial replacement of the MMA monomer with dimethyl itaconate. The Novicky patents, U.S. Pat. Nos. 4,216,303, 4,242,483 and 4,248,989, disclosed contact lenses comprised of high molecular weight polysiloxanylalkyl esters of acrylic and methacrylic acids. Chang, U.S. Pat. No. 4,182,822, disclosed contact lenses comprised of a copolymer from polysiloxanylalkyl ester of acrylic and methacrylic acid essentially the same as disclosed in the Gaylord patents, supra., that were copolymerized with N-vinyl pyrrolidinone or N,N-dimethyl methacrylamide.

Ichinoche, et al., Canadian Pat. No. 1,184,341, teaches the use of organosiloxanyl ester monomer of acrylic and methacrylic acid copolymerized with fluorocarbon ester monomers of acrylic and methacrylic acids and copolymerized to produce oxygen permeable contact lenses. LeBoeuf, U.S. Pat. No. 4,246,389, discloses acrylic siloxane based polymers which also contain HEMA and/or polyvinyl pyrrolidinone which are suitable for use in forming water-containing oxygen permeable contact lenses.

The use of sulfones in the manufacture of plastics and plastic membrane filters to separate oxygen from other gases is known in the prior art. The use of unsaturated alkyl sulfones for the manufacturing of highly oxygen permeable contact lenses is not disclosed and, insofar as is known to the inventor, the use of ethylenically unsaturated alkyl sulfones for the manufacturing of rigid and semi-rigid contact lenses has not been reported.

SUMMARY OF THE INVENTION

The present invention relates to a novel and new generation of contact lenses comprising of copolymers made from siloxanyl ester monomer of acrylic, methacrylic and itaconic acids and perfluoroalkyl ester monomers of acrylic, methacrylic and itaconic acids which are copolymerized with ethylenically unsaturated sulfone alkyl monomers and/or ethylenically unsaturated sulfone ester monomers of acrylic, methacrylic and itaconic acids to produce highly oxygen permeable and improved materials for contact lenses.

The representative organosiloxanylalkyl ester monomers of acrylic and methacrylic acid have the structural formula:

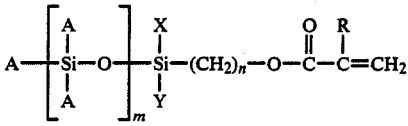

wherein X and Y are $C_1$ to $C_6$, alkyl, cyclic or phenyl groups and/or groups of the following structure:

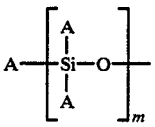

m being an integer from 1 to 6, n being an integer from 1 to 3, A is selected from $C_1$ to $C_6$, alkyl or phenyl groups, and R is methyl group or hydrogen A second useful group of organosiloxanylalkyl ester monomers of acrylic and methacrylic acids are represented by the following formula:

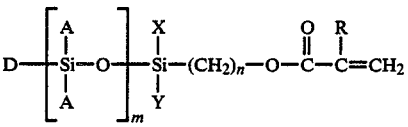

wherein X and Y are $C_1$–$C_6$, alkyl, cyclic or phenyl groups or groups of the following structure:

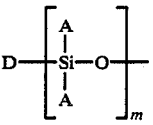

m being an integer from 1 to 6, n being an integer from 1 to 3, A is selected from $C_1$ to $C_6$, alkyl or phenyl groups, R is methyl group or hydrogen, and D is hydrogen or hydroxy group.

A third useful group of organosiloxanylalkyl ester monomers of acrylic and methacrylic acids are represented by the following structural formula:

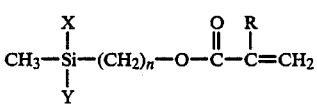

wherein X and Y are groups of the following structure:

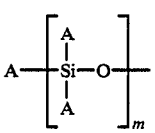

m being an integer from 1 to 5, n is an integer from 1 to 3, wherein A is selected from $C_1$ to $C_6$, alkyl, cyclic or phenyl groups and R is methyl group or hydrogen.

A fourth useful group of organosiloxanylalkyl ester monomers of itaconic acid are represented by the following formula:

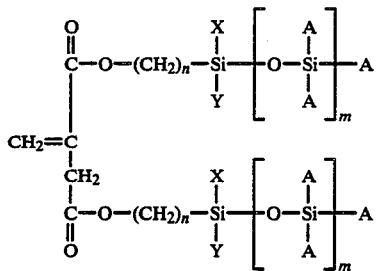

wherein X and Y are $C_1$ to $C_6$, alkyl, cyclic or phenyl groups or groups of the following structure:

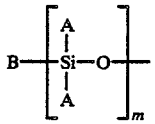

m being an integer from 1 to 5, n being an integer from 1 to 3, wherein A is selected from $C_1$ to $C_6$, alkyl, cyclic or phenyl groups, and B is methyl group or hydrogen.

The perfluoroaklyl ester monomers of acrylic and methacrylic acid are represented by the following formula:

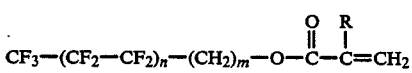

and telomer alcoholmethacrylates or acrylates of the following formula:

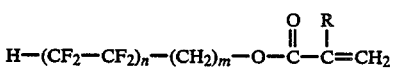

and mixtures thereof; wherein, n is an integer from 1 to 10, m is an integer from 1 to 5 (preferably 1 or 2), and R is methyl group or hydrogen. Particularly useful in the manufacture of the lenses of the present invention are those fluoroalkyl esters selected from the group consisting of perfluoroalkyl ethyl acrylates and methacrylates of the following formula:

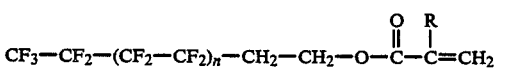

wherein, n is an integer from 1 to 10, and R is methyl group or hydrogen.

The perfluoroalkyl ester monomers of itaconic acid useful in the present invention for the manufacturing of contact lenses are represented by the following formula:

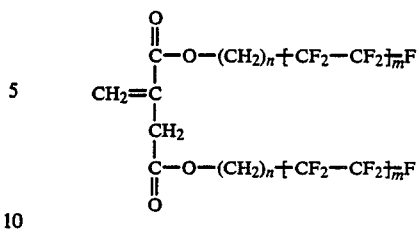

wherein, n is an integer from 1 to 4 and m is an integer from 1 to 10.

Additional perfluorocarbon monomers useful in the present invention are found in the European Patent Application No. 0084406 by David E. Rice, et al., such monomers having the following general structural formula:

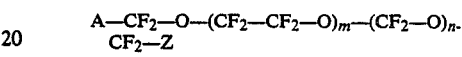

wherein, m is an integer from 2 to 20, n is an integer from 2 to 30, A is selected from $CF_3-$, $CH_3-$, $CH_2F-$, and $CF_2H-$; and Z has the formula which includes one of the following:

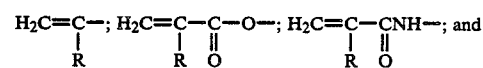

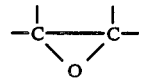

and mixtures thereof.

The principal sulfone monomers embodied in the present invention which highly contribute to the increased oxygen permeability of the contact lens material are represented by the following general structural formula:

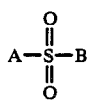

wherein A is selected from one of the following:

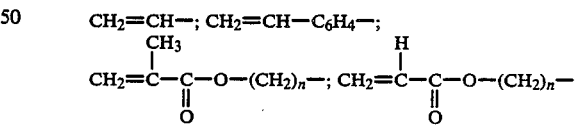

n being an integer from 1 to 5, wherein B is $C_1$ to $C_{20}$, alkyl, cyclic or phenyl groups. The preferable sulfone monomers which are useful in the present invention are namely:
methyl vinyl sulfone,
methyl styrene sulfone,
ethyl vinyl sulfone,
ethyl styrene sulfone,
propyl vinyl sulfone,
propyl styrene sulfone,
phenyl vinyl sulfone,
phenyl styrene sulfone,
cyclohexyl vinyl sulfone, cyclohexyl styrene sulfone,
pentyl vinyl sulfone,
pentyl styrene sulfone,
butyl vinyl sulfone,
butyl styrene sulfone,
phenoxyethyl vinyl sulfone,
phenoxyethyl styrene sulfone,
divinyl sulfone,
methacryloxyethyl methyl sulfone,
methacryloxyethyl ethyl sulfone,
methacryloxyethyl propyl sulfone,
methacryloxyethyl butyl sulfone,
methacryloxyethyl phenyl sulfone,
methacryloxyethyl pentyl sulfone,
methacryloxyethyl styrene sulfone and
mixtures thereof.

The copolymer plastic material of the present invention also incorporates hardening agents such as methyl methacrylate, ethyl methacrylate, propyl methacrylate, cyclohexyl methacrylate, glycidyl methacrylate, phenoxyethyl methacrylate, phenyl methacrylate, tetrahydrofurfuryl methacrylate, methyl acrylate, ethyl acrylate, propyl acrylate, cyclohexyl acrylate, phenoxyethyl acrylate, phenyl acrylate, tetrahydrofurfuryl acrylate, dimethyl itaconate, diethyl itaconate, dipropyl itaconate, dicyclohexyl itaconate, diphenyl itaconate, vinyl benzene (styrene), divinyl benzene and equivalents.

The contact lens material is further modified by the incorporation of wettability and cross-linking agents to improve overall performance of the contact lens on the human eye. Such representative monomers of wettability agents are acrylic acid, methacrylic acid, 2-hydroxyethyl acrylate, 2-hydroxyethyl methacrylate, 2,3-dihydroxypropyl acrylate, 2,3-dihydroxypropyl methacrylate, and/or N-vinyl pyrrolidinone or mixtures thereof. Representative cross-linking agents are ethylene glycol dimethacrylate, diethylene glycol dimethacrylate, triethylene glycol dimethacylate, tetraethylene glycol dimethacrylate, dimethacrylate siloxanyl ester monomer (PSX-563A), ethylene glycol diacrylate, diethylene glycol diacrylate, triethylene glycol diacrylate, tetraethylene glycol diacrylate, divinyl benzene, divinyl sulfone and/or trimethylol propane trimethacrylate or mixtures thereof.

A variety of other ingredients may be included in the polymerization mixture so that to either enhance or provide specific properties. For example, wettability of the surface of the lens is a very important characteristic for contact lenses to possess in order to provide comfort and good visual acuity. In addition to already disclosed wettability agents, herein, additional ethylenically unsaturated monomers can also be incorporated that have a hydrophilic group such as hydroxy, carboxy, carbonamido sulfonyl, and sulfonamido groups. As an example, it can be 2-carboxyethyl acrylate, 2-carbonamidoethyl methacrylate, 2-sulfoethyl methacrylate, 2-sulfonamidoethyl acrylate, vinyl sulfonic acid, and mixtures thereof.

The preferred composition of the present invention comprises:

(a) from about 1 to 30 weight percent of ethylenically unsaturated sulfone monomer or mixtures thereof;

(b) from about 5 to 65 weight percent of ethylenically unsaturated organosiloxanyl alkyl ester monomer of acrylic, methacrylic, and/or itaconic acids or mixtures thereof;

(c) from about 2 to 20 weight percent of ethylenically unsaturated perfluoroalkyl ester monomer or mixtures thereof;

(d) from about 10 to 60 weight percent of hardening agent monomer (preferably, methyl methacrylate or cyclohexyl methacrylate) or mixtures thereof;

(e) from about 1 to 18 weight percent of difunctional cross-linking monomer (preferably, triethylene glycol dimethacrylate, tetraethylene glycol dimethacrylate) or mixtures thereof; and (f) from about 1 to 15 weight percent of wetting agent monomer (preferably methacrylic acid or N-vinyl pyrrolidinone) or mixtures thereof.

The copolymer plastic can also be prepared without perfluoroalkyl ester monomer and the material would still possess high oxygen permeability and good wettability.

The polymerization of the oxygen permeable material for the manufacture of contact lenses disclosed in the present invention is accomplished by using free-radical polymerization, such techniques being disclosed in the prior art; for example, Ellis U.S. Pat. No. 4,152,508, example 1. The monomers can also be polymerized by using free radical polymerization techniques in base curve pre-molded polypropylene caps. The polymerization techniques are demonstrated by the following examples:

EXAMPLE 1

This example illustrates the preparation of oxygen permeable contact lens material based on silicone and sulfone monomers of the composition consisting of 34 parts of oxygenfree tris(trimethylsiloxy)methacryloxypropylsilane, 12 parts of methyl vinyl sulfone,, 15 parts of cyclohexyl methacrylate, 8 parts of triethylene glycol dimethacrylate, 6 parts of methacrylic acid, 5 parts of dimethyl itconate, 18 parts of methyl methacrylate, 0.24 parts df tert-butyl peroxyoctoate and 0.11 parts of benzoyl peroxide thoroughly mixed and poured into glass or polypropylene molds (tubes) and then polymerized in accordance with the polymerization procedure disclosed in Ellis' U.S. Pat. No. 4,152,508, example 1. The resulting copolymer plastic is transparent, hard, durable, wettable, has good machinability, appearance is straw-like, off-clear color, and highly suitable for manufacturing oxygen permeable contact lenses.

EXAMPLE 2

The procedure of Example 1 is repeated except that the amounts and kinds of components in the polymerization is changed as follows: 40 parts of tris(hydrodimethylsiloxy)methacryloxypropylsilane, 5 parts of perfluorohexylethylmethacrylate, 10 parts of vinyl methyl sulfone, 12 parts of cyclohexyl methacrylate, 10 parts of tetraethylene glycol dimethacrylate, 5 parts of methacrylic acid, 17 parts of methyl methacrylate and 0.7 parts of divinyl sulfone, and the same amount of free-radical initiator as in Example 1 is thoroughly mixed. The resulting mixture is poured into polypropylene molds (or tubes) and polymerized at 42° C. for at least ten hours; then the copolymer plastic in the molds is transferred to thermostated oven, and the temperature is raised to 105° C. and the polymer plastic is cured for an additional seventeen hours. The resulting plastic has oxygen permeability of $50$–$70 \times 10^{-11}$ $(cm^2/sec)(ml\ O_2/ml \times mm\ Hg)$, if analyzed on the Schema-Versatae Model #920 instrument (an analytical technique widely used in the industry).

EXAMPLE 3

The polymerization of a mixture of 20 parts of 1,1,9-trihydrofluorononylmethacrylate, 20 parts of bis[tris(-trimethylsiloxy)silylpropyl]itaconate, 10 parts of vinyl methyl sulfone, 20 parts of cyclohexyl methacrylate, 10 parts of diethylene glycol diemethacrylate, 4 parts of methacrylic acid, 3 parts of N-vinyl pyrrolidone and 12 parts of methyl methacrylate is polymerized in accordance with Example 1, in polypropylene base curve pre-molded caps. The resulting plastic gives a transparent concave plug.

EXAMPLE 4

An opaque plug is prepared from 20 parts of bis(pentamethyldisiloxanyl)methylmethacryloxypropylsilane, 10 parts of vinyl benzene (styrene), 10 parts of vinyl methyl sulfone, 20 parts of tris(trimethylsiloxy)methacryloxypropylsilane, 15 parts of cyclohexyl methacrylate, 10 parts of dicyclohexyl itaconate, 14 parts of methyl acrylate and 0.2 parts of black pigment polymerized in accordance with Example 2. The lenses prepared from the plug are hard, opaque, highly oxygen permeable and useful in cataract surgery procedures.

EXAMPLE 5

This example illustrates the preparation of a highly oxygen permeable contact lens material which is suitable for manufacturing of contact lenses to be worn on extended wear basis. To a 300 ml flask, add 40 parts of mixture of siloxanylalkyl ester monomers of methacrylic acid having a refractive index of $n_D^{25}=1.4175$, 15 parts of cyclohexyl methacrylate, 7 parts of methacrylic acid, 6 parts of triethylene glycol dimethacrylate,32 parts of methyl methacrylate, 15 parts of methyl vinyl sulfone, 0.55 parts of tert-butyl peroxypivalate, and 0.20 parts of Vazo-33 are thoroughly mixed and polymerized in polypropylene molds at 45° C. in accordance with the procedure described in Example 1. The resulting copolymer plastic is highly oxygen permeable, transparent, durable, machinable, and suitable for manufacturing contact lenses which could be worn overnight if thickness of the lens is less than 0.15 mm.

EXAMPLE 6

A plastic rod was prepared by thoroughly mixing 30 parts of tris(trimethylsiloxy)methacryloxypropylsilane, 15 parts of methyl styrene sulfone, 10 parts of bis(perfluorohexylethyl)itaconate, 15 parts of cyclohexyl methacrylate, 10 parts of methylcyclohexylitaconate and 19 parts of phenoxyethylmethacrylate are polymerized using free-radical polymerization techniques as described in Example2. The resulting copolymer plastic is clear in appearance, having higher index of refraction than that of silicone-acrylate copolymers in the prior art and is highly oxygen permeable.

EXAMPLE 7 THROUGH 15

Samples of optically clear plastic are prepared in accordance with the polymerization procedure described in Example 1, except that the amounts and kinds of components may be different, as shown in the following table:

TABLE

| Components (Parts) | 7 | 8 | 9 | 10 | 11 | 12 | 13 | 14 | 15 |
|---|---|---|---|---|---|---|---|---|---|
| tris(trimethylsiloxy-silylpropylmethacrylate | 30 | 40 | 20 | 15 | 5 | 50 | 35 | 35 | 40 |
| bis(dimethylsiloxy)silylpropylmethacrylate | 10 | 5 | 20 | 30 | 40 | 0 | 15 | 0 | 0 |
| perfluorohexylethylmethacrylate | 5 | 10 | 15 | 17 | 0 | 0 | 6 | 3 | 5 |
| methyl vinyl sulfone | 18 | 7 | 10 | 6 | 15 | 10 | 10 | 12 | 10 |
| methyl methacrylate | 15 | 10 | 22 | 16 | 8 | 30 | 60 | 8 | 17 |
| cyclohexyl methacrylate | 18 | 8 | 12 | 10 | 20 | 12 | 15 | 10 | 10 |
| phenoxyethyl methacrylate | 0 | 5 | 0 | 3 | 0 | 0 | 5 | 0 | 0 |
| diethylene glycol dimethacrylate | 8 | 9 | 10 | 6 | 8 | 9 | 10 | 6 | 0 |
| tetraethylene glycol dimethacrylate | 3 | 0 | 0 | 3 | 3 | 1 | 0 | 5 | 8 |
| methacrylate siloxanyl dimer PSX-563A | 2 | 3 | 3 | 2 | 3 | 0 | 2 | 0 | 2 |
| methacrylic acid | 5 | 6 | 5 | 6 | 6 | 6 | 4 | 5 | 6 |
| N—vinyl 2-pyrrolidinone | 4 | 4 | 6 | 4 | 4 | 5 | 6 | 4 | 0 |
| dimethyl itaconate | 5 | 5 | 5 | 6 | 10 | 5 | 8 | 12 | 2 |

EXAMPLE 16

This example illustrates the preparation of oxygen permeable copolymer plastic for contact lenses from siloxanylalkyl ester of acrylic acid and sulfone monomer consisting of 43 parts of tris(trimethylsiloxy)silylmethacryloxypropyl, 10 parts of methyl sulfonyl methacryloxymethyl, 8 parts of cyclohexyl methacrylate, 20 parts of tetrahydrofurfuryl methacrylate, 5 parts of 2-hydroxyethyl methacrylate, 7 parts of N-vinyl pyrrolidinone, 7 parts of trimethylolpropane trimethacrylate, and 0.25 parts of ABVDN initiator are polymerized. The resulting copolymer plastic has hardness 84±2 as measured by Shore D (ASTM-2240) hardness tester.

EXAMPLE 17

A copolymer plastic is prepared using polymerization procedure of Example 1 and the composition as follows: 40 parts of tris(heptamethyltrisiloxanyl)methacryloxypropylsilane, 10 parts of methyl styrene sulfone, 12 parts of cyclohexyl methacrylate, 5 parts of phenyl methacrylate, 5 parts of perfluoroalkyl ester monomer of methacrylic acid (Dupont 1837), 27 parts of methyl methacrylate, 0.35 parts of tert-butyl peroxypivalate, and 0.15 parts of benzoyl peroxide are thoroughly mixed and poured into suitable polypropylene or sililated glass molds and polymerized at 42° C. in accordance with Example 1. The resulting copolymer is a straw-like, off-clear color, hard, transparent, and suitable for manufacturing contact lenses.

EXAMPLE 18

A contact lens has been manufactured from the oxygen permeable material of the present invention using standard, conventional manufacturing techniques known in the art. The base curve of the lens was cut at 7.75 mm, the front curve of the lens was cut at 8.16 mm, center thickness of the lens was 0.17 mm. The contact lens was then polished using a technique widely known in the contact lens industry. The base curve of the lens was 7.74 mm, after the lens was polished the base curve remained at 7.75 mm. The lens was soaked over sixty hours in Soaklens solutions and the base curve remained at 7.75 mm.

The embodiments of the invention which are claimed as an exclusive property or privilege are defined as follows:

1. An ophthalmic device formed of a copolymer plastic material which comprises:

[A] at least one organosilicone selected from the group consisting of
(1) an organosiloxanylalkyl ester monomer of acrylic or methacrylic acid which has the structural formula:

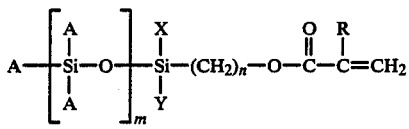

wherein X and Y are $C_1$ to $C_6$ alkyl, cycloalkyl or phenyl groups; or groups of the following structure:

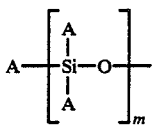

m being an integer from 1 to 6, n being an integer from 1 to 3, A is selected from $C_1$ to $C_6$ alkyl or phenyl groups, and R is methyl group or hydrogen;

(2) an organosiloxanylalkyl ester monomer of acrylic or methacrylic acid having the structural formula:

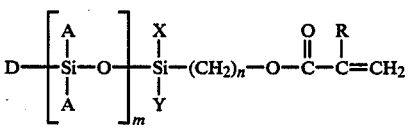

wherein X and Y are $C_1$ to $C_6$ alkyl, cyclohexyl or phenyl groups; or groups of the following structure:

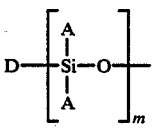

m being an integer from 1 to 6, n being an integer from 1 to 3, wherein A is selected from $C_1$ to $C_6$ alkyl or phenyl groups, R is a methyl group or hydrogen, and D is hydrogen or a hydroxy group;

(3) an organosiloxanylalkyl ester monomer of acrylic or methacrylic acid having the following structural formula:

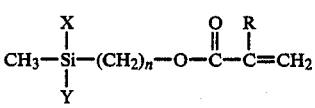

wherein X and Y are groups of the following structure:

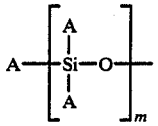

m being an integer from 1 to 5, n is an integer from 1 to 3, wherein A is selected from $C_1$ to $C_6$ alkyl, cyclohexyl or phenyl groups, and R is a methyl group or hydrogen;

(4) an organosiloxanylalkyl ester monomer of itaconic acid having the following formula:

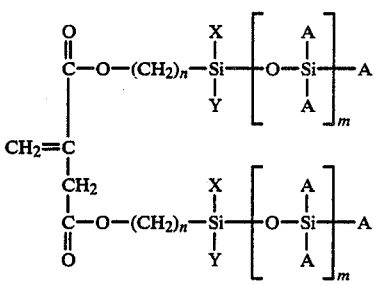

wherein X and Y are $C_1$ to $C_6$ alkyl, cyclohexyl or phenyl groups; or groups of the following structure:

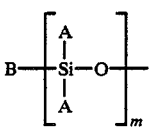

m being an integer from 1 to 5, n being an integer from 1 to 3, A is selected from $C_1$ to $C_6$ alkyl, cyclohexyl or phenyl groups, and B is a member selected from the group consisting of methyl, hydrogen, and mixtures thereof;

which are copolymerized with

[B] at least one fluoroalkyl ester monomer selected from the groups consisting of
(1) perfluoroalkyl ester monomers of acrylic or methacrylic acid having the following formula:

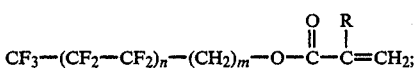

(2) fluorocarbon telomer alcoholmethacrylates or acrylates of the following formula:

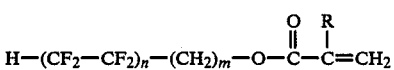

wherein n is an integer from 1 to 18, m is an integer from 1 to 5, and R is a methyl group or hydrogen;

(3) perfluoroalkyl ethyl acrylates and methacrylates of the following formula:

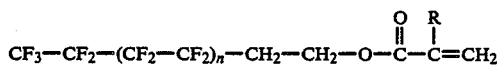

wherein n is an integer from 1 to 10, and R is a methyl group or hydrogen;

(4) perfluoroalkyl ester monomers of itaconic acid having the general formula:

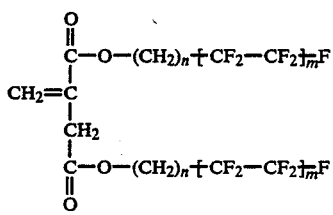

wherein n is an integer from 1 to 4 and m is an integer from 1 to 10; said copolymer plastic material including

[C] at least one organosulfone monomer selected from the group consisting of a polymerizable ethylenically unsaturated organosulfone monomer having the general structural formula:

wherein A is selected from one or more of the following:

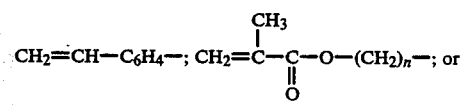

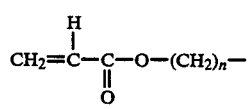

n being an integer from 1 to 5, wherein B is at least one member selected from the group consisting of phenyoxyethyl, $C_1$ to $C_6$ alkyl, cycloalkyl and phenyl group.

2. An ophthalmic device formed of a copolymer plastic material which comprises:

[A] at least one orgaosilicone selected from the group consisting of (1) an organosiloxanylalkyl ester monomer of acrylic or methacrylic acid which has the structural formula:

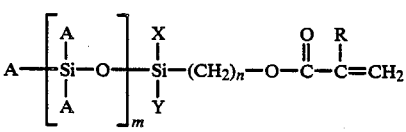

wherein X and Y are $C_1$ to $C_6$ alkyl, cycloalkyl or phenyl groups; or groups of the following structure:

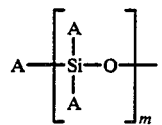

m being an integer from 1 to 6, n being an integer from 1 to 3, A is selected from $C_1$ to $C_6$ alkyl or phenyl groups, and R is a methyl group or hydrogen;

(2) an organosiloxanylalkyl ester monomer of acrylic or methacrylic acid having the structural formula:

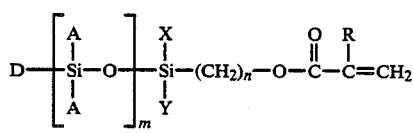

wherein X and Y are $C_1$ to $C_6$ alkyl, cyclohexyl or phenyl groups; or group of the following structure:

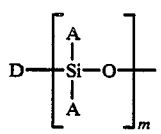

m being an integer from 1 to 6, n being an integer from 1 to 3, wherein A is selected from $C_1$ to $C_6$ alkyl or phenyl groups, R is a methyl group or hydrogen, and D is hydrogen or a hydroxy group;

(3) an organosiloxanylalkyl ester monomer of acrylic or methacrylic acid having the following structural formula:

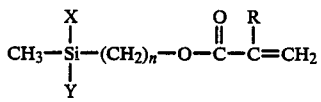

wherein X and Y are groups of the following structure:

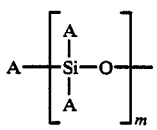

m being an integer from 1 to 5, n is an integer from 1 to 3, wherein A is selected from $C_1$ to $C_6$ alkyl, cyclohexyl or phenyl groups, and R is a methyl group or hydrogen;

(4) an organosiloxanylalkyl ester monomer of itaconic acid having the following formula:

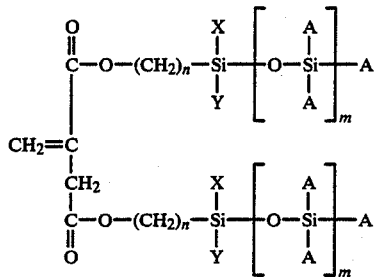

wherein X and Y are $C_1$ to $C_6$ alkyl, cyclohexyl or phenyl groups; or groups of the following structure:

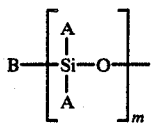

m being an integer from 1 to 5, n being an integer from 1 to 3, A is selected from $C_1$ to $C_6$ alkyl, cyclohexyl or phenyl groups, and B is a member selected from the group consisting of methyl, hydrogen, and mixtures thereof;

which are copolymerized with

[B] at least one fluoroalkyl ester monomer selected from the group consisting of (1) perfluoroalkyl ester monomers of acrylic or methacrylic acid having the following formula:

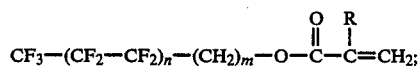

(2) fluorocarbon telomer alcoholmethacrylates or acrylates of the following formula:

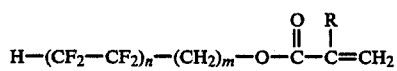

wherein n is an integer from 1 to 18, m is an integer from 1 to 5, and R is a methyl group or hydrogen;

(3) perfluoroalkyl ethyl acrylates and methacrylates of the following formula:

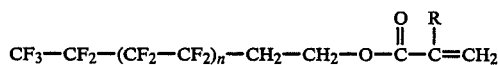

wherein n is an integer from 1 to 10, and R is a methyl group or hydrogen;

(4) perfluoroalkyl ester monomers of itaconic acid having the general formula:

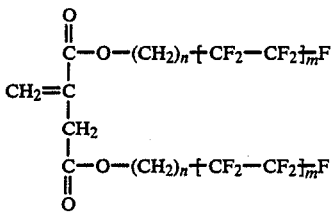

wherein n is an itneger from 1 to 4 and m is an integer from 1 to 10;

said copolymer plastic material including

[C] at least one organosulfone monomer selected from the group consisting of a polymerizable ethylenically unsaturated organosulfone monomer having the structural formula:

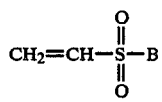

wherein B is at least one member selected from the group consisting of phenoxyethyl, $C_1$ to $C_{20}$ alkyl, cycloalkyl and phenyl group; said copolymer platic material including

[D] cyclohexyl methacrylate.

3. An ophthalmic device according to claim 1 which is manufactured from an oxygen permeable copolymer plastic material which comprises:

(a) from about 2 to 30 weight percent of an ethylenically unsaturated sulfone monomer or mixtures thereof; said sulfone monomer being selected from the group consisting of methyl styrene sulfone, ethyl styrene sulfone, propyl styrene sulfone, phenyl styrene sulfone, cyclohexyl styrene sulfone, pentyl styrene sulfone, butyl styrene sulfone, phenoxyethyl styrene sulfone, methacryloxyethyl methyl sulfone, methacryloxyethyl ethyl sulfone, methacryloxyethyl propyl sulfone, methacryloxyethyl butyl sulfone, methacryloxyethyl phenyl sulfone, methacryloxyethyl pentyl sulfone, methacryloxyethyl styrene sulfone, and mixtures thereof, which is copolymerized with:

(b) organosiloxanylalkyl ester monomers of acrylic, methacrylic, itaconic acids and mixtures thereof.

4. An ophthlamic device which is manufactured from an oxygen permeable copolymer plastic material according to claim 1 wherein the organosilicone ester monomer is present in an amount of from about 5 to about 65 weight percent.

5. An ophthalmic device manufactured from an oxygen permeable contact lens material as defined in claim 1, further comprising from about 10 to 60 weight percent of a hardening agent monomer.

6. The ophthalmic device of claim 2 in the form of a contact lens further comprising from about 2 to 18 weight percent of a difunctional cross-linking monomer or mixtures thereof, and from about 2 to 15 weight percent of a wetting agent monomer.

7. An ophthalmic device according to claim 2, wherein said device comprises the polymerization product of:

[A] from about 10 to 60 weight percent of an ethylenically unsaturated organosiloxanylalkyl ester monomer selected from the group of acids consisting of acrylic, methacrylic, itaconic and mixtures thereof; and additionally

[B] from about 2 to 20 weight percent of at least one fluoroalkyl ester monomer selected from the group consisting of an (1) ethylenically unsaturated hydroperfluoroalkyl ester monomer having the following structural formula:

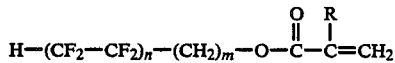

$$H-(CF_2-CF_2)_n-(CH_2)_m-O-\overset{O}{\overset{\|}{C}}-\overset{R}{\overset{|}{C}}=CH_2$$

and mixtures thereof, wherein n is an integer from 1 to 10, m is an integer from 1 to 5, and R is a methyl group or hydrogen;

(2) perfluoroalkyl ethyl acrylates and methacrylates of the following formula:

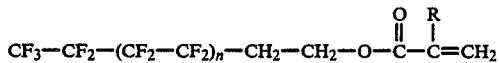

$$CF_3-CF_2-(CF_2-CF_2)_n-CH_2-CH_2-O-\overset{O}{\overset{\|}{C}}-\overset{R}{\overset{|}{C}}=CH_2$$

wherein n is an integer from 1 to 8 and R is a methyl group or hydrogen; and (3) perfluoroalkyl ester monomers of itaconic acid having the following formula:

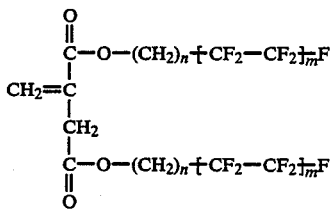

wherein n is an integer from 1 to 4 and m is an integer from 1 to 10; and

[C] from about 1 to 30 weight percent of at least one sulfone from the group consisting of vinyl methyl sulfone, vinyl ethyl sulfone, vinyl propyl sulfone, and mixtures thereof.

8. An ophthalmic device in the form of a contact lens obtained by curing the material as defined in claim 2, wherein [C] is methyl vinyl sulfone monomer.

9. An ophthalmic device in the form of a contact lens obtained by curing the material as defined in claim 2, wherein [C] is a sulfone selected from the group consisting of vinyl methyl sulfone, and vinyl phenyl sulfone.

10. A contact lens material consisting essentially of a polymer resulting from the polymerization of methyl vinyl sulfone, tris(trimethylsiloxy)siloxanylmethacryloxypropylsilane, cyclohexyl methacrylate, triethylene glycol dimethacrylate, dimethyl itaconate, methacrylic acid and N-vinyl pyrrolidinone.

11. The ophthalmic device according to claim 1, wherein said copolymer plastic material includes a hardening agent.

12. The ophthalmic device according to claim 11, wherein said hardening agent is selected from the group consisting of methyl methacrylate, ethyl methacrylate, propyl methacrylate, cyclohexyl methacrylate, glycidyl methacrylate, phenoxyethyl methacrylate, phenyl methacrylate, tetrahydrofurfuryl methacrylate, methyl acrylate, ethyl acrylate, propyl acrylate, cyclohexyl acrylate phenoxyethyl acrylate, phenyl acrylate, tetrahydrofurfuryl acrylate, dimethyl itaconate, diethyl itaconate, dipropyl itaconate, dicyclohexyl itaconate, diphenyl itaconate, vinyl benzene (styrene), and divinyl benzene.

13. The ophthlamic device according to claim 1, wherein there is incorporated at least one wettability agent.

14. The ophthalmic device according to claim 13, wherein said wettability agent is selected from the group consisting of acrylic acid, methacrylic acid, 2-hydroxyethyl acrylate, 2-hydroxyethyl methacrylate, 2,3-dihydroxypropyl acrylate, 2,3-dihydroxypropyl methacrylate, N-vinyl pyrrolidinone and mixtures thereof.

15. The ophthlamic device according to claim 1, wherein there is included a cross-linking agent.

16. The ophthalmic device according to claim 15, wherein said cross-linking agent is selected from the group consisting of ethylene glycol dimethacrylate, diethylene glycol dimethacrylate, triethylene glycol dimethacrylate, tetraethylene glycol dimethacrylate, ethylene glycol diacrylate, tetraethylene glycol diacrylate, divinyl benzene, trimethylolpropane trimethacrylate, and mixtures thereof.

17. An ophthalmic device according to claim 1, including a hardening agent monomer selected from the group consisting of methyl methacrylate, cyclohexyl methacrylate, ethyl methacrylate, and mixtures thereof.

18. A contact lens according to claim 6, wherein said wetting agent monomer is a member selected from the group consisting of methacrylic acid, N-vinyl pyrrolidinone, and mixtures thereof.

19. A ophthalmic device according to claim 1 wherein said organosulfone monomer is selected from the group consisting of
methyl styrene sulfone,
ethyl styrene sulfone,
propyl styrene sulfone,
phenyl styrene sulfone,
cyclohexyl styrene sulfone,
pentyl styrene sulfone,
butyl styrene sulfone,
phenoxyethyl styrene sulfone,
methacryloxyethyl methyl sulfone,
methacryloxyethyl ethyl sulfone,
methacryloxyethyl propyl sulfone,
methacryloxyethyl butyl sulfone,
methacryloxyethyl phenyl sulfone,
methacryloxyethyl pentyl sulfone,
methacryloxyethyl styrene sulfone, and
mixtures thereof.

20. An ophthalmic device according to claim 2 which comprises:

(a) from about 1 to 30 weight percent of said polymerizable ethylenically unsaturated organosulfone monomer;

(b) from about 5 to 65 weight percent of said organosiloxanyl alkyl ester monomer of acrylic, methacrylic, itaconic acid, or mixtures thereof;

(c) from about 2 to 20 weight percent of said perfluoroalkyl ester monomer, or mixtures thereof;

(d) from about 10 to 60 weight percent of a cyclohexyl methacrylate;

(e) from about 1 to 18 weight percent of a difunctional cross-linking agent; and (f) from about 1 to 15 weight percent of a wetting agent monomer.

21. An oxygen permeable contact lens material which is the copolymerization product of:

34 parts by weight of oxygen-free tris(trimethylsiloxy)methacryloxypropylsilane, 12 parts by weight of methyl vinyl sulfone, 15 parts by weight of cyclohexyl methacrylate, 8 parts by weight of triethylene glycol dimethacrylate, 6 parts by weight of methacrylic acid, 5 parts by weight of dimethyl itaconate, and 18 parts by weight of methyl methacrylate.

22. An oxygen-permeable contact lens material which is the copolymerization product of:
    40 parts by weight of tris(hydrodimethylsiloxy)methacryloxypropylsilane, 5 parts by weight of perfluorohexylethyl methacrylate, 10 parts by weight of methyl vinyl sulfone, 12 parts by weight cyclohexyl methacrylate, 10 parts by weight of tetraethylene glycol diemthacrylate, 5 parts by weight of methacrylic acid, 17 parts by weight of methyl methacrylate, and 0.7 parts by weight of divinyl sulfone.

23. An oxygen-permeable contact lens material which is the copolymerization product of:
    20 parts by weight of 1,1,9-trihydrofluorononylmethacrylate, 20 parts by weight of bis[tris(trimethylsiloxy)silylpropyl] itaconate, 10 parts by weight of vinyl methyl sulfone, 20 parts by weight of cyclohexyl methacrylate, 10 parts by weight of diethylene glycol dimethacrylate, 4 parts by weight of methacrylic acid, 3 parts by weight of N-vinyl pyrrolidinone, and 12 parts by weight of methyl methacrylate.

24. The ophthalmic device of claim 2 in the form of an oxygen permeable contact lens which is the copolymerization product of:
    40 parts by weight of a mixture of siloxanylalkyl ester monomers of methacrylic acid having a refractive index of $n_D^{25}=1.4175$, 15 parts by weight of cyclohexyl methacrylate, 7 parts by weight of methacrylic acid, 6 parts by weight of triethylene glycol dimethacrylate, 32 parts by weight of methyl methacrylate, and 15 parts by weight of methyl vinyl sulfone.

25. The ophthalmic device of claim 1 in the form of an oxygen permeable contact lens which is the copolymerization product of:
    40 parts by weight of tris(heptamethyltrisiloxyanyl)methacryloxypropylsilane, 10 parts by weight of methyl styrene sulfone, 12 parts by weight of cyclohexylmethacrylate, 5 parts by weight of phenyl methacrylate, 5 parts of the perfluoroalkyl ester monomer of methacrylic acid and 27 parts by weight of methyl methacrylate.

26. An oxygen-permeable contact lens material which is the copolymerization product of:
    43 parts by weight of tris(trimethylsiloxy)methacryloxypropylsilane, 10 parts by weight of methacryloxyethyl methyl sulfone, 8 parts by weight of cyclohexyl methacrylate, 20 parts by weight of tetrahydrofurfuryl methacrylate, 5 parts by weight of 2-hydroxyethyl methacrylate, 7 parts by weight of N-vinyl pyrrolidinone, and 7 parts by weight of trimethylolpropane trimethacrylate.

27. An ophthalimic device manufactured from the copolymerization product of:
    20 parts by weight of bis(pentamethyldisiloxanyl)methylmethacryloxypropylsilane, 10 parts by weight of vinyl benzene, 10 parts by weight of methyl vinyl sulfone, 20 parts by weight of tris(trimethylsiloxy)methacryloxypropylsilane, 15 parts by weight of cyclohexyl methacrylate, 10 parts by weight of dicyclohexyl itaconate, and 14 parts by weight of methyl acrylate.

* * * * *